Feb. 21, 1928.
A. H. G. FOKKER
1,659,650
MECHANICAL MOVEMENT
Filed Nov. 12, 1924
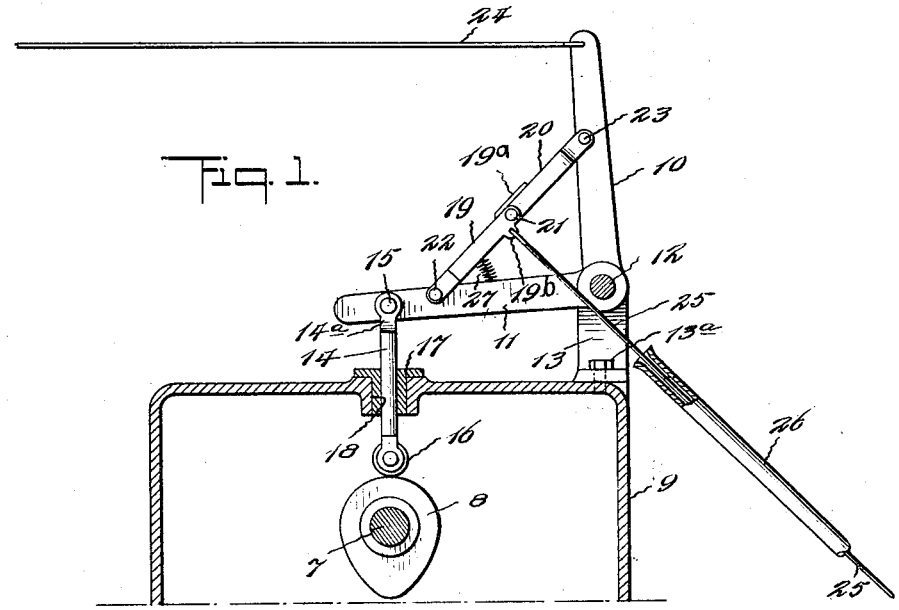
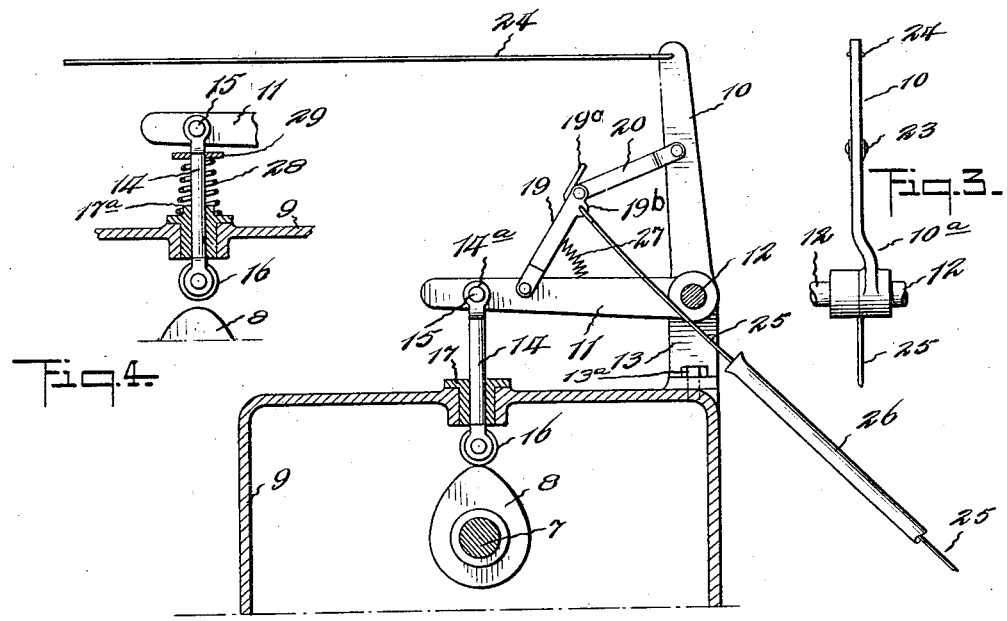
INVENTOR
Anthony H. G. Fokker
BY
P. Frank Jones
ATTORNEY Patented Feb. 21, 1928.

1,659,650

UNITED STATES PATENT OFFICE.

ANTHONY H. G. FOKKER, OF AMSTERDAM, NETHERLANDS.

MECHANICAL MOVEMENT.

Application filed November 12, 1924. Serial No. 749,467.

The present invention relates generally to mechanical movements, and is more especially directed to controlling mechanisms as employed in the transmission of power to actuate an element at a point remote from the position of the operator.

While my invention is susceptible of a mutiplicity of uses in controlling the transmission of power to the work, for the purposes of the present disclosure, I shall describe it as employed in the operation of so-called power-driven machine guns as used in aircraft.

As is well known, the firing of machine guns, as used in aircraft is usually electrically or mechanically controlled in a manner designed to insure firing of the gun only at the instant that the path of the bullet will be unobstructed by the blades of the revolving propeller or screw. The means most commonly used provide for the mechanical operation of the gun by a driven shaft, as the crank-shaft of the aircraft engine. The mechanisms are of various types, embodying gear trains or more or less complicated arrangements of cams and levers which necessitate incorporating specially designed parts in the structure of the engine or gun, with the resultant increase in cost of installation and maintenance. Furthermore, at best, these cumbersome prior devices have been found to be generally unreliable because of the difficulty of synchronizing the gun firing mechanism with the revolution of the engine crank-shaft so that the gun will fire between the propeller blades at engine speeds which vary several hundred revolutions from the normal.

The general object of the present invention is to provide a simple mechanical movement which is susceptible to general application in controlling the transmission of power from the source to the work and which when employed as a control mechanism for aircraft machine guns will overcome the disadvantages of existing types of devices of the kind in a highly efficient manner.

More specifically, the object of my invention is to provide a control mechanism for power driven guns which may be economically produced and expeditiously installed without alteration to the gun or engine structure, thereby permitting of the rapid conversion of existing commercial or unarmed aircraft into a fighting force.

My invention also contemplates a mechanism having the aforesaid advantages and characteristics, whereby the gun may be located at any desired point remote from the engine or source of power and its operation positively controlled so as to insure synchronization of the firing mechanism with the revolution of the engine shaft at all speeds of the latter.

It is also an object of my invention to provide a gun firing mechanism of the type described, which may be readily rendered operative or non-operative by manually actuatable means remote from such mechanism and the elements connected thereby.

Other objects and advantages of my invention, as well as uses, will present themselves as the description proceeds and I would have it understood that I reserve unto myself all rights to the full range of equivalents, both in structure and in uses, to which I may be entitled under my invention in its broadest aspect.

For the purpose of presenting a clear description of the construction and operation of my invention, I have elected to illustrate and describe a preferred embodiment thereof, arranged to function as a control mechanism for a machine gun adapted to be driven by the engine of an airplane or the like.

In the drawings:

Figure 1, is a view in elevation of my invention, showing the relative positions of the parts when the firing mechanism is connected to the engine.

Figure 2, is a view similar to Figure 1 in which the positions of the parts are shown when the control mechanism is rendered non-operative.

Figure 3, is an end elevation, taken from the right of Figure 2, and

Figure 4 is an enlarged detail of a modified structure whereby the cam-follower is held out of engagement with the cam when the control is not operating.

Referring now to the drawings in detail, in which like characters of reference are employed to designate similar parts in the several views, 7 indicates an overhead cam-shaft of an internal combustion engine having a plurality of valve actuating cams, such as shown at 8, mounted thereon. These cams function to open the exhaust and intake valves of the engine in synchronism with the engine cycles in the well known manner.

In the overhead valve type of engine described, the cam-shaft is usually protected or covered by a housing, such as shown at 9, which is bolted or otherwise locked to the engine head.

The controlling mechanism comprises two arms or levers 10 and 11 which are pivotally mounted on the short shaft 12 supported in bearings at the upper end of the bracket 13, the said bracket being of any suitable design and rigidly fastened to the housing as by bolts 13ª.

A rod 14 having a yoke or bifurcated end 14ª adapted to straddle the lever 11 is pivoted to the latter at 15, and provided with a roller or cam-follower 16 at its lower end. This rod 14 it will be observed, is capable of reciprocatory movement within the bearing formed by the bushing 17 positioned within the aperture or bore 18 provided in the top of the housing 9, directly over the cam 8.

Connecting the levers 10 and 11 intermediate of their ends is a breakable link composed of two arms 19 and 20 which are hinged at 21, the arm 19 being pivoted at 22 to the lever 11, while the arm 20 is similarly fastened to the lever 10 at 23. A wire or cable 24 is detachably connected to the upper end of the lever 10 which leads to the firing mechanism of the gun (not shown). A second wire or cable 25 is connected in the eye 19ᵇ of the arm 19 of the breakable link, which passes through a tube or conduit 26 to the cockpit or other convenient part of the air craft.

From the foregoing, it will be seen that the lever 11 will be rocked or oscilated on its fucrum 12 as the cam 8 revolves in contact with the cam-follower 16. Normally, the said lever 11 moves independently of the lever 10 as the slack in the wire or cable 25 permits the arms 19 and 20 of the link to move upon the hinge 21, their breaking movement being accelerated by the action of the spring 27 in engagement with the link arm 19 and the lever 11 as shown in Figure 2.

When it is desired to actuate the gun firing mechanism, the cable or wire 25 is drawn taut, bringing the arms 19 and 20 of the link into alinement against the stop 19ª of the arm 19 and in opposition to the expansion force of the said spring 27. The levers 10 and 11 are then positively connected and move as a single unit on their common axis in the same manner as would obtain in a bell-crank lever of the usual construction, the portions of the said levers adjacent to their hubs preferably being offset, as shown at 10ª in Figure 3, in order to transmit the forces in a straight line.

It will be obvious that as the composite bell-crank lever rocks upon its fulcrum, the gun firing mechanism will be actuated in synchronism with the cam motion, through the medium of the cable 24. To render the gun firing mechanism non-operative, the cable or wire 25 is released to permit the lever 11 to again move independently of the lever 10, as heretofore described.

In Figure 4, I have illustrated a modified structure, in which a spring 28 surrounding the rod 14 and held between the head 17ª of the bushing 17 and the washer or collar 29, serves to maintain the cam-follower 16 out of engagement with the cam 8 when it is not desired to transmit power to the gun firing mechanism. This arrangement eliminates undue wear of the cooperating parts of the mechanism which might follow from constant motion, as is the case where the cam-follower is in continuous engagement with the cam 8.

From the description of the structure and operation of my invention, it will be manifest that the objects heretofore set forth may be readily attained; also, that, while my invention has been shown in certain specific forms, various changes may be made in the structural details, without departing from the spirit and scope thereof.

What I claim is:

1. A mechanical movement comprising a fitting, a pair of relatively angularly disposed levers mounted upon said fitting for independent oscillation upon a common axis, means carried by one of said levers for continuous engagement with a cam, a yieldable connection between said levers, and means for rendering said connection non-yieldable whereby said two levers will move as a unit on their aforesaid common axis.

2. The combination with an internal combustion engine having a cam-shaft and a cam mounted thereon of means for operating an element in synchronism with the revolution of said cam-shaft, said means comprising a bracket detachably connected to said engine, a lever normally in a perpendicular plane, a second lever normally horizontally disposed, both of said levers being supported from said bracket for oscillation on a common axis, a cam-follower carried by one of said levers in constant engagement with said cam, an articulated link connecting said levers, said link being adapted to yield under a predetermined condition to permit of the movement of the horizontally disposed lever relatively to the remaining lever and means for rendering said articulated link rigid whereby said levers will be positively connected to oscillate as a unit in response to the movement of said cam.

3. The combination with an internal combustion engine having a cam-shaft and a cam mounted thereon, of means for firing a gun at pre-determined intervals in synchronization with the revolution of the engine crank-shaft, said means comprising a pair of levers independently rotatable about a common axis, a cam-follower carried by one of said levers adapted to travel upon said cam, a yieldable connection between said levers to permit of the independent movement thereof and flexible means for rendering said yieldable connection rigid whereby said levers will be actuated as a single unit.

4. A mechanism for controlling the transmission of power, comprising a pair of relatively angularly disposed levers mounted to rotate about a common axis, means for imparting motion to one of said levers, means connecting the other of said levers to the work, a yieldable connection between said levers whereby one of said levers may move independently of the other and means for rigidly connecting said levers to move as a unit on said axis, to transmit power to the work.

5. A mechanism for controlling the transmission of power, comprising a pair of relatively angularly disposed levers mounted to rotate about a common axis, means for imparting motion to one of said levers, means connecting the other of said levers to the work, a hinged connection between said levers whereby one of said levers may move independently of the other, and flexible means operable at a point remote from said levers to connect them to rotate upon said axis as a unit to transmit power to the work.

6. A mechanism for controlling the transmission of power, comprising a pair of levers having a common axis normally disposed in planes at right angles to each other, one of said levers being adapted to be positively actuated upon its axis, an articulated link connecting said levers, said link being adapted to yield as the actuated lever is oscillated upon its axis so that the other lever will remain inactive, and means for rendering said link rigid whereby said two levers will move in unison, as a bell-crank lever, on their common axis.

7. The combination with an internal combustion engine having a cam-shaft and a cam mounted thereon of means for operating a machine-gun for firing in synchronism with the rotation of the engine crankshaft, said means comprising a bracket detachably mounted upon said engine, a pair of levers supported from said bracket for oscillation on a common axis, said levers being normally disposed in planes at right angles to each other, a rod pivotally connected to one of said levers, said rod being reciprocable within a bearing in said engine, a cam-follower carried by said rod, an articulated link pivotally connected to each of said levers, means for connecting one of said levers to a machine-gun trigger, and means for rendering the sections of said articulated link movable and immovable relatively to each other whereby the machine-gun trigger actuating lever may be rendered inoperative or operative at will irrespective of the continued movement of the cam driven lever.

ANTHONY H. G. FOKKER.